(12) United States Patent
Sloan et al.

(10) Patent No.: US 8,534,693 B2
(45) Date of Patent: Sep. 17, 2013

(54) BICYCLE CHAIN GUIDE ASSEMBLY

(75) Inventors: Brandon Dale Sloan, Morgan Hill, CA (US); David Allen, Soquel, CA (US); Jan Talavasek, Morgan Hill, CA (US); Joseph Edward Buckley, Santa Cruz, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 60 days.

(21) Appl. No.: 13/079,316

(22) Filed: Apr. 4, 2011

(65) Prior Publication Data

US 2012/0248730 A1    Oct. 4, 2012

(51) Int. Cl.
*B62M 9/136* (2010.01)
*B62M 9/138* (2010.01)

(52) U.S. Cl.
USPC ............... 280/284; 280/288.4; 280/304.3

(58) Field of Classification Search
USPC .......... 280/259–261, 284, 288, 288.4, 304.3, 280/152.3; 474/140, 144, 111, 80; 150/167
See application file for complete search history.

(56) References Cited

U.S. PATENT DOCUMENTS

| | | | |
|---|---|---|---|
| 629,667 A * | 7/1899 | Denbigh | 280/304.3 |
| 4,054,063 A | 10/1977 | Perrin | |
| 4,919,644 A | 4/1990 | Carlyle | |
| 5,013,285 A * | 5/1991 | Carlyle | 474/80 |
| 5,397,146 A * | 3/1995 | Fischer | 280/288.4 |
| 5,470,278 A * | 11/1995 | Chen | 474/133 |
| 5,556,347 A * | 9/1996 | Liu | 474/110 |
| D445,532 S * | 7/2001 | Larson | D26/126 |
| 6,533,690 B2 | 3/2003 | Barnett | |
| 7,691,019 B2 | 4/2010 | Gogo | |
| 7,708,662 B2 | 5/2010 | Uchiyama et al. | |
| 2003/0236142 A1* | 12/2003 | Yamamoto | 474/80 |
| 2005/0009652 A1* | 1/2005 | Chen et al. | 474/144 |
| 2007/0032324 A1* | 2/2007 | Uchiyama et al. | 474/140 |
| 2007/0265121 A1 | 11/2007 | Gross | |
| 2009/0062049 A1 | 3/2009 | Cranston et al. | |
| 2009/0295120 A1* | 12/2009 | Sloan et al. | 280/274 |
| 2010/0234154 A1 | 9/2010 | Klieber | |

* cited by examiner

*Primary Examiner* — Anne Marie M Boehler
(74) *Attorney, Agent, or Firm* — Michael Best & Friedrich LLP (57) ABSTRACT

A bicycle having a wheel and a frame supported by the wheel. The frame includes a wheel support and a stay extending from the wheel support. A stay protector engages the stay, and a chain guide member is coupled to the stay protector to support and align the chain. The chain guide member comprises a guide mount and a guide carriage. The guide mount is secured to the stay protector, and the guide carriage is supported by the guide mount. The bicycle chain passes through a channel formed on the guide carriage.

16 Claims, 9 Drawing Sheets

BICYCLE CHAIN GUIDE ASSEMBLY

BACKGROUND

The present invention relates generally to bicycles, and more specifically to chain guides for bicycles.

When a bicycle is ridden over rough terrain, the chain of the bicycle often moves vertically relative to the bicycle frame. This vertical movement can cause the chain to impact a portion of the bicycle frame called the stay (e.g., a chainstay or seatstay). In order to protect the stay from such impacts, bicycles are commonly provided with a stay protector on the surface of the stay on the chain side of the bicycle (usually the right side).

Movement of the chain can also cause the chain to become unintentionally disengaged from the front chainring on which the chain rides, thereby inhibiting the drive function of the chain. In order to inhibit the chain from becoming disengaged from the front chainring, bicycles are sometimes provided with a chain guide that restricts large movements of the chain relative to the chainring and thereby inhibits the chain from slipping off of the chainring. Such chain guides are typically mounted on a guide mount or flange secured near the bottom bracket area of the bicycle frame.

SUMMARY OF THE INVENTION

The present invention provides a bicycle having a chain guide assembly that is coupled to a stay protector. The chain guide assembly restricts the motion of the bicycle chain and prevents it from uncontrollably slipping off the gears or damaging other components of the bicycle. More specifically, the invention is particularly applicable to a bicycle having a wheel (e.g., a rear wheel) and a frame supported by the wheel. The frame includes a wheel support and a stay extending from the wheel support. A stay protector resiliently engages the stay (e.g., the right chainstay). The chain guide is coupled to the protector and forms a channel through which a lower run of the chain passes.

In one embodiment, the invention provides a stay protector formed to substantially match the exterior surface of a tubular-shaped stay. A chain guide member is coupled to the stay protector. The chain guide member comprises a guide mount and a guide carriage. The guide mount is secured to the stay protector, and the guide carriage is supported by the guide mount. The bicycle chain passes through a channel formed on the guide carriage.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
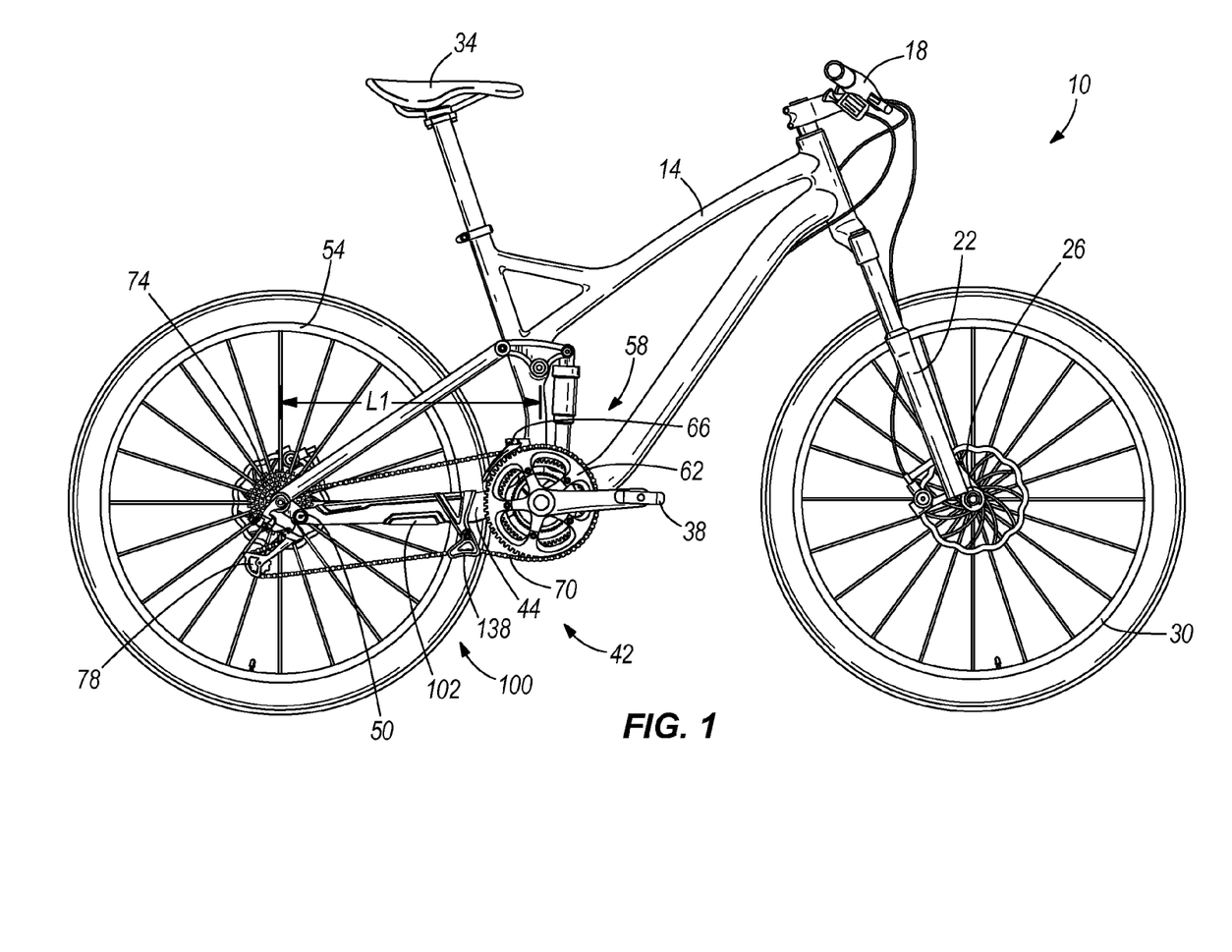
FIG. 1 is a side view of a bicycle that includes a chain guide assembly embodying the present invention.

Referring to FIG. 1, the illustrated bicycle 10 includes a frame 14, handlebars 18, a front fork 22, a front wheel support 26, a front wheel 30, a seat 34, pedals 38, a drive-train 42, a right rear stay 44, a left rear stay 46 (see FIG. 2), a right rear wheel support 50, a left rear wheel support 52 (see FIG. 2), and a rear wheel 54. The illustrated frame 14 is supported by the wheels 30, 54 and includes a rear suspension 58 that is coupled to the frame 14. In other constructions, the bicycle 10 may have other configurations or may include other components. Bicycle components are well known and one skilled in the art will recognize that the invention may be practiced with many different bicycles.

Referring again to FIG. 1, the illustrated drive-train 42 includes a front chainring 62, a front derailleur 66, a chain 70, rear cogs 74, and a rear derailleur 78. The illustrated drive-train 42 is positioned on a right side of the bicycle 10. The chain 70 connects the front chainrings 62 to the rear cogs 74 through the front and rear derailleurs 66, 78, and the front and rear derailleurs 66, 78 are capable of moving the chain 70 between different front chainrings 62 and rear cogs 74, respectively. The functionality of bicycle drive-trains 42 is well known to those skilled in the art and will not be discussed further herein. In other constructions, more, less, or different drive-train components may be included as is known by those skilled in the art. For example, a fixed-gear bicycle may include a single chainring 62, a single rear cog 74, and a chain 70 without front or rear derailleurs 66, 78.

With reference to FIG. 1, the right rear wheel support 50 is positioned on the right side of the frame 14 and the left rear wheel support 52 is positioned on the left side of the frame 14. The right and left rear wheel supports 50, 52 engage and support the rear wheel 54 such that the frame 14 is supported by the rear wheel 54. In other embodiments, the right and left rear wheel supports 50, 52 may have a different arrangement or configuration, as is known by those skilled in the art.

Figure 2:
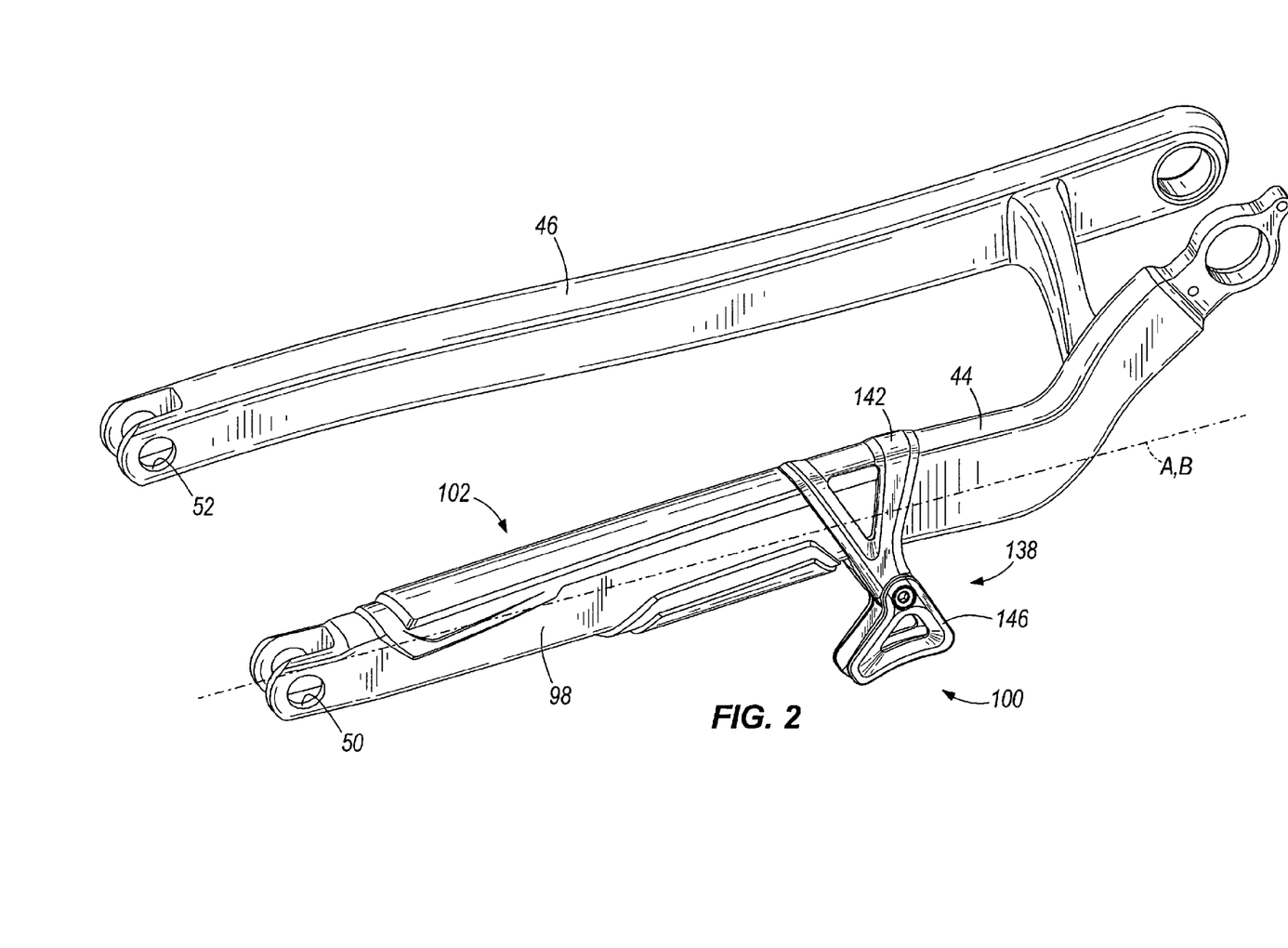
FIG. 2 is a perspective view of the chain guide assembly of FIG. 1 mounted on a chainstay of the bicycle.

Referring to FIGS. 1 and 2, the illustrated right and left rear stays 44, 46 are components of the rear suspension 58 and extend from the right and left rear wheel supports 50, 52, respectively. The right and left rear stays 44, 46 are arranged such that the rear wheel 54 is positioned between and supported by the two stays 44, 46. The illustrated right rear stay 44 is positioned with respect to the drive-train 42 such that the chain 70 passes over and under the right rear stay 44. Each illustrated rear stay 44, 46 is a tubular-shaped member with an exterior surface 98 that defines a longitudinal axis A. The stays have an effective length L1 defined as the distance from the rotational axis of the rear wheel 54 to the rotational axis of the chainring 62.

The illustrated bicycle 10 further includes a chain guide assembly 100 comprising a stay protector 102 and a guide member 138. The stay protector 102 resiliently engages the right rear stay 44 such that during normal operation the stay protector 102 maintains a substantially constant position and orientation with respect to the right rear stay 44. The stay protector may be of any type, including that disclosed in U.S. application Ser. No. 12/132,458, Publication No. 2009/0295120, the entire contents of which are hereby incorporated by reference.

Figure 3:
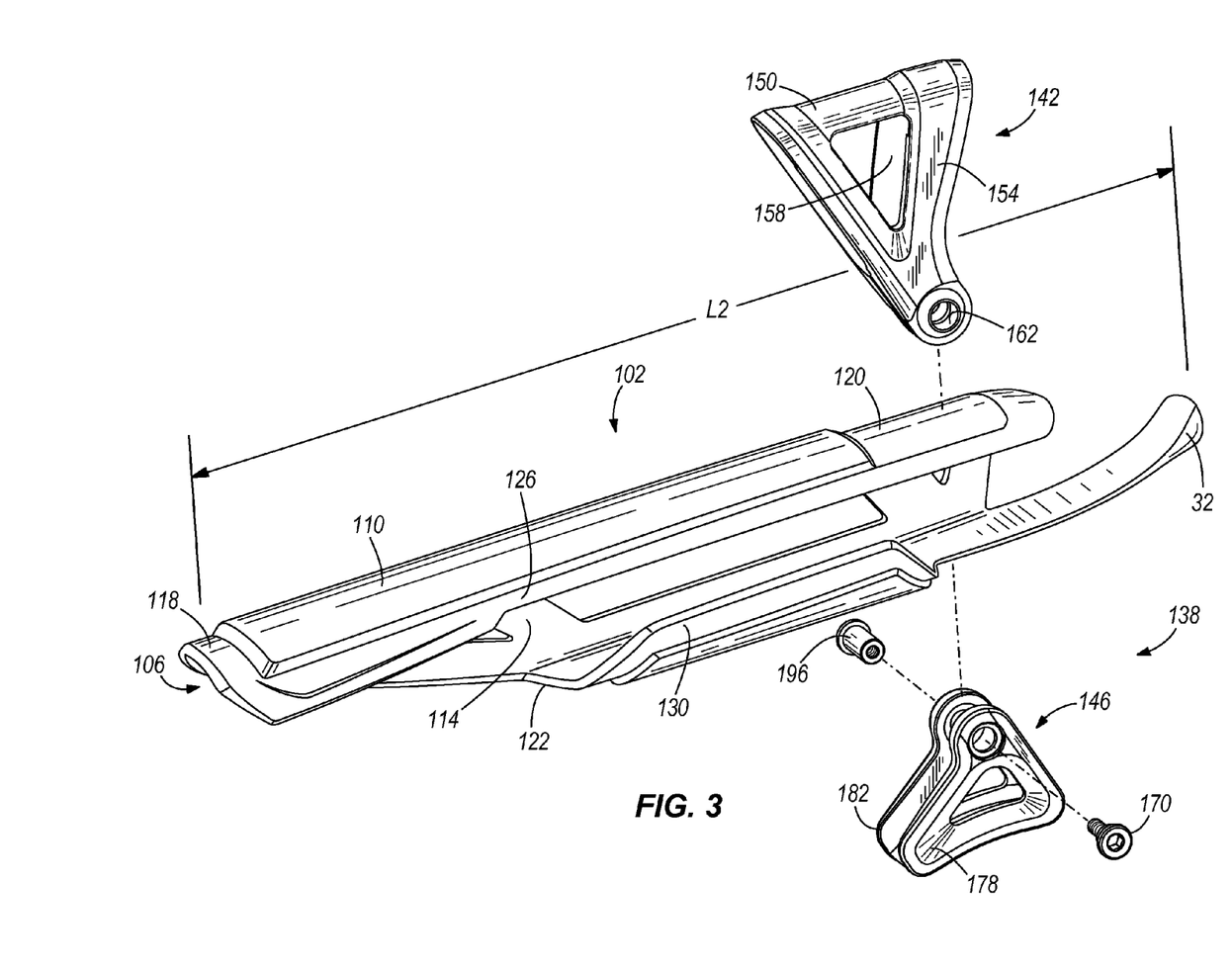
FIG. 3 is an exploded view of the chain guide assembly of FIG. 1.

Referring to FIGS. 2 and 3, the illustrated stay protector 102 is a partially tubular-shaped member constructed of resilient material, such as molded plastic, and includes a resilient body member 106 and a guard member 110. The illustrated resilient body member 106 engages the right rear stay 44 (FIG. 2) and defines a longitudinal axis B parallel with the stay longitudinal axis A. The shape of the illustrated resilient body member 106 varies along the longitudinal axis B such that the resilient body member 106 defines varying internal dimensions (i.e. an internal height and internal width) that substantially match the exterior surface 98 of the right rear stay 44. The stay protector 102 is held in resilient engagement with the right rear stay 44 by the frictional forces created by the resiliency of the body member 106 and does not require any fasteners, adhesives, or other fixing means to maintain a constant position and orientation with respect to the right rear stay 44. The stay protector 102 has a length L2 that is at least 50% of the effective length L1 of the stays.

Figure 4:
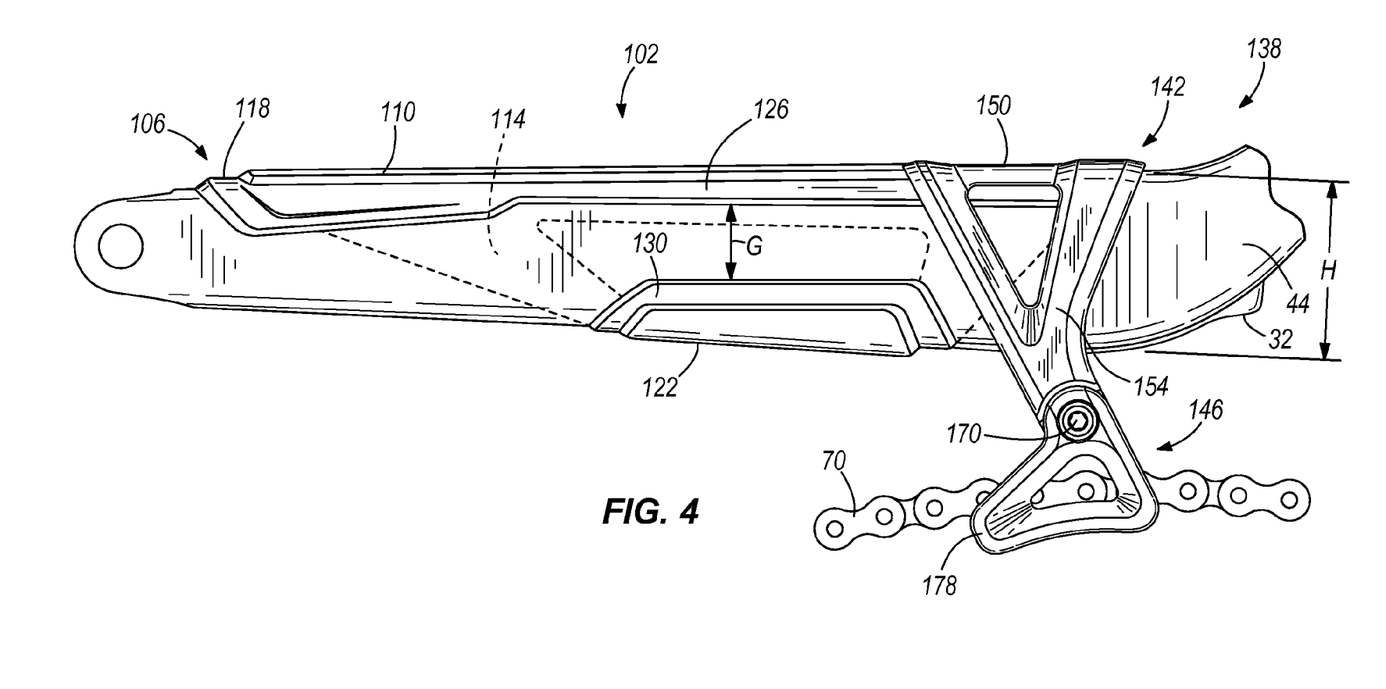
FIG. 4 is a right-side view of the chain guide assembly and chainstay of FIG. 1.

With reference to FIGS. 3 and 4, the illustrated resilient body member 106 includes a central portion 114, a top portion 118, and a bottom portion 122, an upper engaging portion 126, a lower engaging portion 130. The central portion 114 connects the top portion 118 and the bottom portion 122, the upper engaging portion 126 is adjacent the top portion 118, and the lower engaging portion 130 is adjacent the bottom portion 122. The top portion 118 further includes a recess 120. The edges of the upper engaging portion 126 and the lower engaging portion 130 of the stay protector 102 are separated by a gap G (FIG. 4). The resilient body member 106 further includes a lower tongue 132 that protrudes forward of the remaining portion of the body member 106 and runs along the bottom surface of the stay to protect that surface from contact by road debris (e.g., rocks, dirt, stumps) and the chain 70.

In operation, the illustrated stay protector 102 resiliently engages the right rear stay 44 such that the stay protector 102 maintains a substantially constant position and orientation with respect to the right rear stay 44. To mount the stay protector 102 onto the right rear stay 44, the stay protector 102 is flexed such that the gap G between the upper engaging portion 126 and the lower engaging portion 130 is large enough to accommodate the height H of the right rear stay 44. Once the gap G is large enough, the stay protector 102 made be slid onto the right rear stay 44 and placed in a desired position on the right rear stay 44. The stay protector 102 may then be released such that the gap G recoils and the stay protector 102 resiliently engages the right rear stay 44. Once in place, the stay protector 102 is held in place by the friction between the body member 106 and the right rear stay 44, which is created by the resiliency of the resilient body member 106. The stay protector 102 inhibits the chain 70 and other objects from damaging the right rear stay 44.

The illustrated stay protector 102 may be removed from the right rear stay 44 by flexing the stay protector 102 such that the gap G is large enough to fit over the height H of the right rear stay 44. The stay protector 102 may then be removed from the right rear stay 44.

Referring to FIGS. 3 and 4, the guide member 138 is coupled to the body member 106. The guide member 138 comprises a guide mount 142 and a guide carriage 146. The guide mount 142 comprises a top portion 150, a first arm 154, and a parallel second arm 158. The top portion 150 connects the first arm 154 and the second arm 158. The top portion 150 is formed to fit into the recess 120. The top portion 150 is secured within the recess 120 such that the upper surface of the top portion 150 is flush with the upper surface of the top portion 118 of the body member 106 (see FIG. 4).

Figure 5:
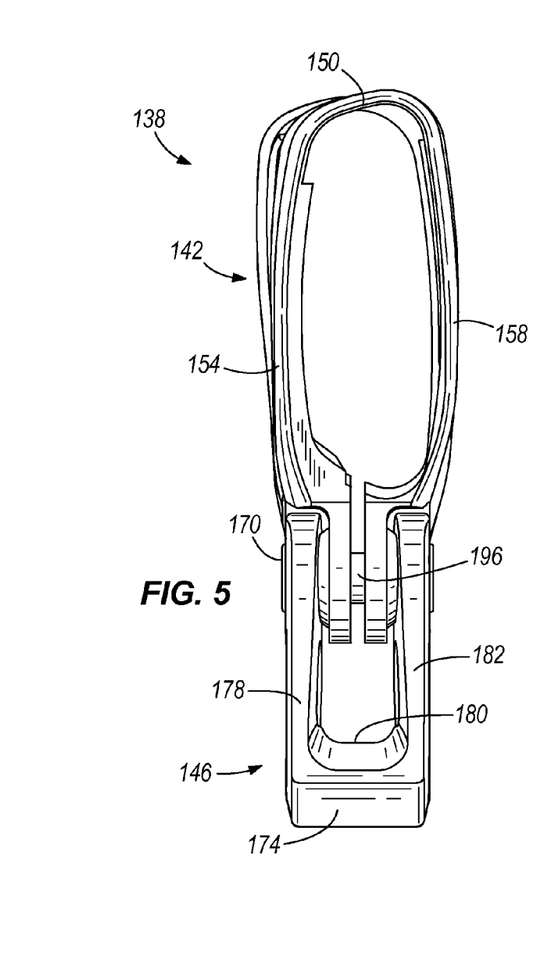
FIG. 5 is a front view of a chain guide member of FIG. 1.
Figure 7:
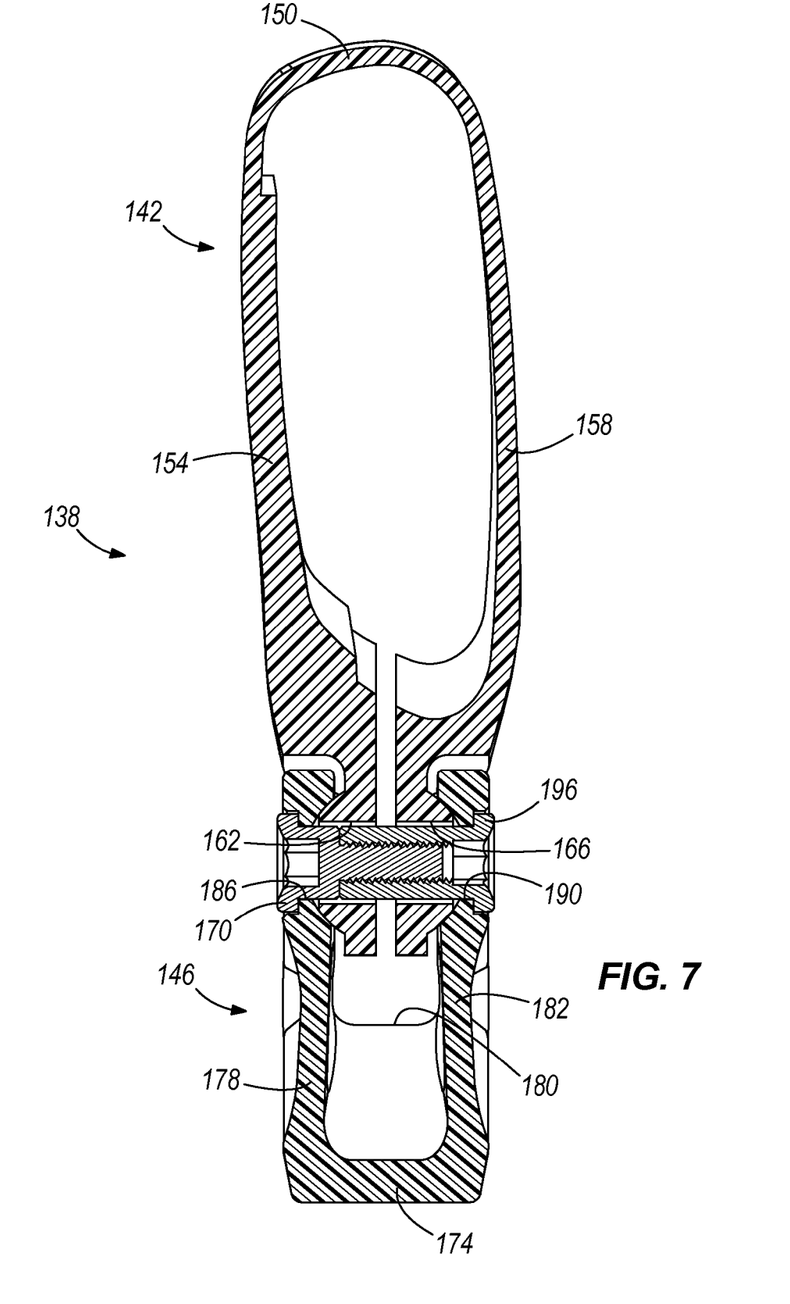
FIG. 7 is a section view of the chain guide assembly taken along the line 7-7 in FIG. 6.

With reference to FIGS. 5 and 7, the first arm 154 includes a first arm hole 162 (FIG. 7) and the second arm 158 includes a second arm hole 166 (FIG. 7). The arm holes 162, 166 are aligned with one another and are adapted for receiving a bolt 170. The guide mount 142 is coupled to the body member 106 such that the first arm 154 and second arm 158 extend in a direction away from the right rear stay 44 toward the lower run of the chain 70 (see FIG. 4).

Figure 6:
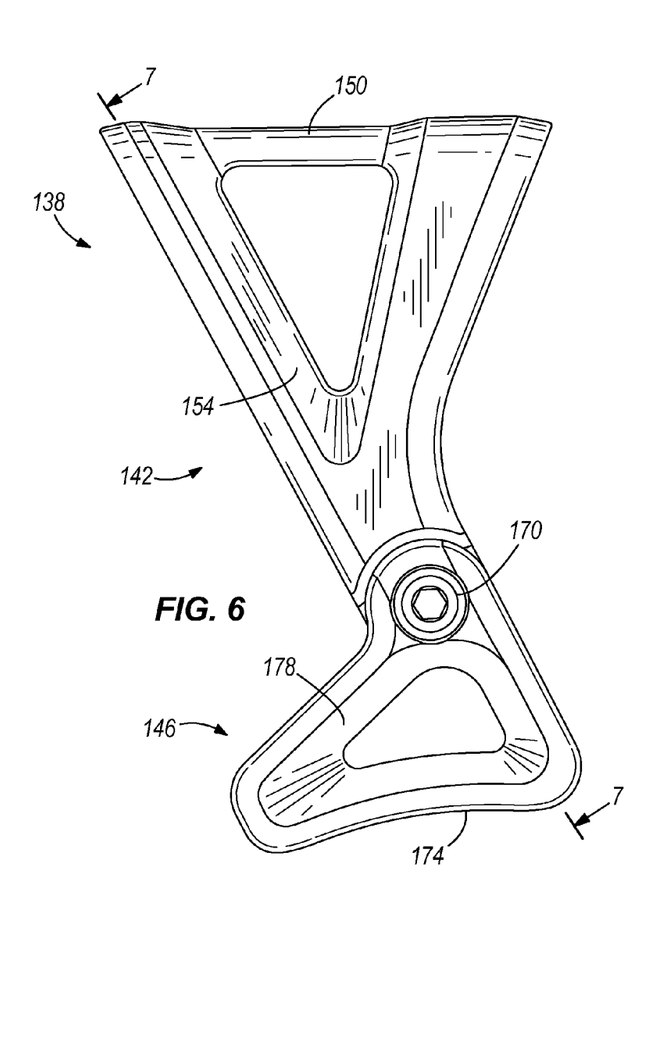
FIG. 6 is a side view of the chain guide member of FIG. 5.

Referring to FIGS. 5-7, the guide carriage 146 includes a base portion 174, a first side 178, and a second side 182. The first side 178 includes a bolt hole 186 and the second side 182 includes a bolt hole 190. The first side 178 and second side 182 are connected by the base portion 174, forming a channel 180. The bicycle chain 70 is supported within the channel 180. Alternatively, the channel 180 may not be completely enclosed by the guide carriage 146, such that the channel 180 includes a gap (not shown) located on one arm 178 or 182. This slot facilitates easy installation and removal of the chain 70 because the chain 70 may be placed within the channel 180 or removed from the channel 180 without requiring disassembly of the guide member 100. The guide carriage 146 can be deformed to increase the size of the gap to allow the chain 70 to pass into and out of the channel 180.

Referring to FIGS. 5 and 7, the guide carriage 146 is coupled to the guide mount 142 by aligning arm holes 162 and 166 with the bolt holes 186 and 190, respectively. A bolt 170 is then passed through the arm holes 162, 166 and the bolt holes 186, 190. The bolt 170 is threaded into a nut 196 on the second side 182. The clamping force exerted by the bolt 170 on the guide mount arms 154 and 158 secures the guide mount 142 around the stay protector 102 and also provides additional securement of the stay protector 102 on the stay 44.

In this way, the guide member 138 provides support for the chain 70 to insure that the chain 70 remains aligned as it travels between the front chainring 62 and the rear derailleur 78. Alternatively, the guide member 138 may be configured to maintain chain alignment between the front chainrings 62 and rear cogs 74 (in the event there is no rear derailleur).

The illustrated guide member 138 is shaped to have an appealing outer appearance when engaged with the stay protector 102. Furthermore, the guide member 138 may be multiple colors, the same colors, or have more or less artistic detail in order to achieve a desired style.

Figure 8:
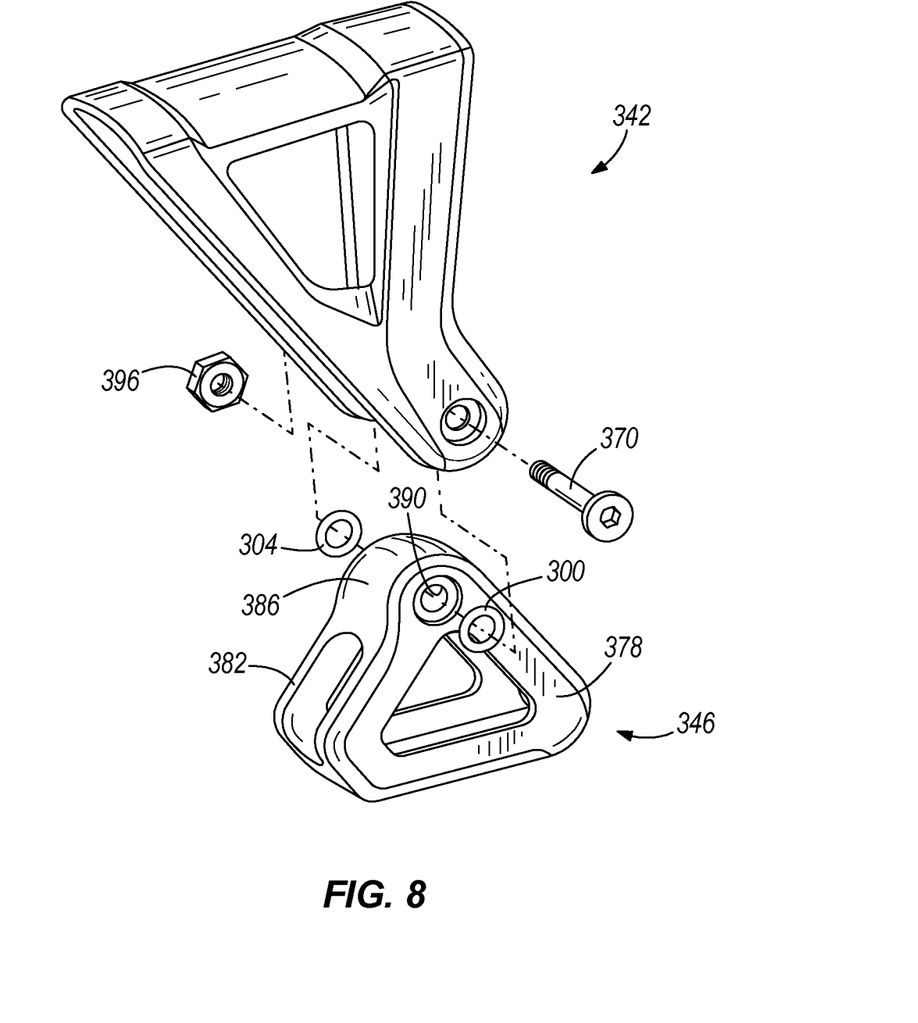
FIG. 8 is an exploded view of an alternative embodiment of the chain guide assembly.
Figure 9:
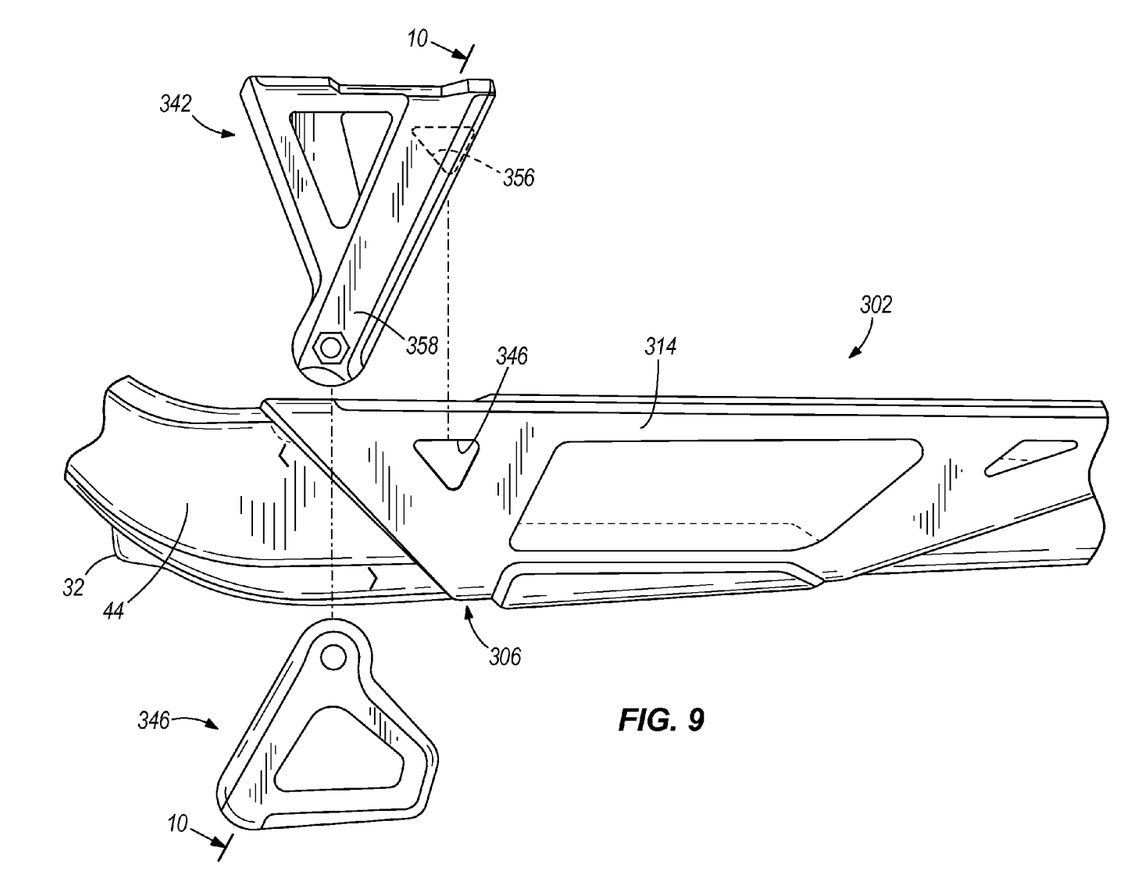
FIG. 9 is a side exploded view of the chain guide assembly of FIG. 8 mounted on a chainstay of the bicycle.
Figure 10:
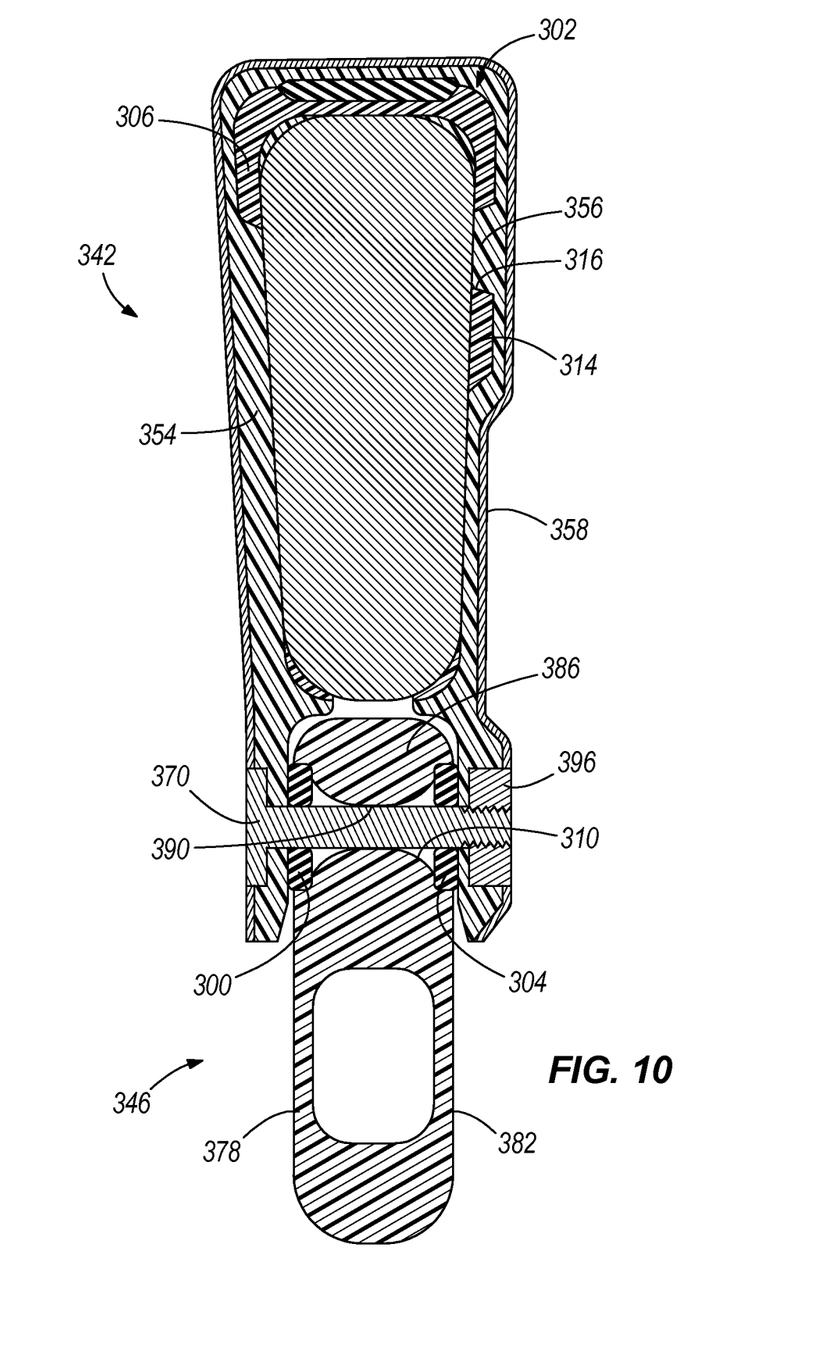
FIG. 10 is a section view of the chain guide assembly of FIG. 9.

In an alternative embodiment, shown in FIGS. 8-10, the central portion 314 on the body member 306 includes a slot 316. In this embodiment, the second arm 358 includes a key 356 that is dimensioned to fit into the slot 316 in the central portion 314 of the body member 306. In this manner, the key 356 aligns and secures the guide mount 342 with respect to the stay protector 302. As used herein, "key" refers to a protrusion and "slot" refers to a recess that receives the protrusion, and neither term should be limited to a particular shape. As the bolt 370 is tightened, the clamping force further secures the key 356 within slot 316 and secures the guide mount 342 to the body member 306.

In the alternative embodiment of FIGS. 8 and 10, the guide carriage 346 further includes a cross member 386. The cross member 386 includes a bore 390 for receiving a bolt 370. The cross member 386 includes a first grommet 300 located adjacent the first side 378 and a second grommet 304 located adjacent the second side 382. A notch 310 is disposed in the area around the bore 390 and between the grommets 300 and 304.

Various features and advantages of the invention are set forth in the following claims.

The invention claimed is:

1. A bicycle comprising:
    at least two wheels;
    a frame including a wheel support and a stay extending from the wheel support, the stay having a stay length;
    a chain for propelling the bicycle; and
    a chain guide assembly coupled to the stay and comprising:
        a stay protector mounted on the stay and having a protector length that is at least 50% of the stay length; and
        a guide member secured to the stay protector and having a portion that fits over the stay protector, wherein the chain is positioned through the guide member,
    wherein an outer surface of the stay protector is flush with an outer surface of the guide member.

2. A bicycle as claimed in claim 1, the stay protector comprises:
    a body member including a resilient material adapted to resiliently engage the stay, the body member having an outer surface; and
    a guard member positioned on the outer surface of the body member.

3. A bicycle as claimed in claim 1, wherein the stay protector and guide member are separable from each other.

4. A bicycle as claimed in claim 3, wherein one of the stay protector and the guide member includes a key and the other includes a slot for receiving the key, the guide member and stay protector being coupled by inserting the key into the slot.

5. A bicycle as claimed in claim 1, wherein the stay protector includes an outer surface having a recessed portion, and wherein the guide member is mounted on the recessed portion of the stay protector.

6. A bicycle as claimed in claim 1, wherein the guide member includes:
    a guide mount coupled to the stay; and
    a guide carriage supported by the guide mount, wherein the chain is positioned through the guide carriage.

7. A bicycle as claimed in claim 6, wherein the guide carriage is detachable from the guide mount.

8. A bicycle as claimed in claim 6, wherein the guide mount is clamped to the stay by a fastener, and wherein the fastener secures the guide carriage to the guide mount.

9. A bicycle comprising:
    at least two wheels;
    a frame including a wheel support and a stay extending from the wheel support;
    a chain for propelling the bicycle; and
    a chain guide assembly coupled to the stay and comprising:
        a stay protector mounted on the stay; and
        a guide member secured to the stay protector,
        wherein the stay protector and guide member are separable from each other, and one of the stay protector and the guide member includes a key and the other includes a slot for receiving the key, the guide member and stay protector being coupled by inserting the key into the slot.

10. A bicycle as claimed in claim 9, the stay protector comprises:
    a body member including a resilient material adapted to resiliently engage the stay, the body member having an outer surface; and
    a guard member positioned on the outer surface of the body member.

11. A bicycle as claimed in claim 9, wherein the stay has a stay length, and wherein the stay protector has a protector length that is at least 50% of the stay length.

12. A bicycle as claimed in claim 9, wherein the stay protector includes an outer surface having a recessed portion, and wherein the guide member is mounted on the recessed portion of the stay protector.

13. A bicycle as claimed in claim 9, wherein an outer surface of the stay protector is flush with an outer surface of the guide member.

14. A bicycle as claimed in claim 9, wherein the guide member includes:
    a guide mount coupled to the stay; and
    a guide carriage supported by the guide mount, wherein the chain is positioned through the guide carriage.

15. A bicycle as claimed in claim 14, wherein the guide carriage is detachable from the guide mount.

16. A bicycle as claimed in claim 14, wherein the guide mount is clamped to the stay by a fastener, and wherein the fastener secures the guide carriage to the guide mount.

* * * * *